Figure 1:
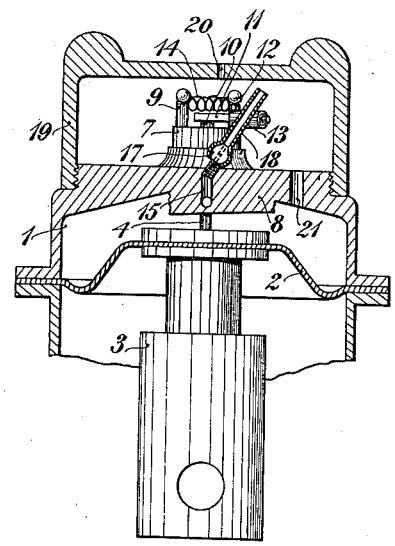

C. V. HENRICHSEN.
PULSATOR FOR PNEUMATIC MILKING.
APPLICATION FILED JAN. 6, 1911.

1,045,402. Patented Nov. 26, 1912.

Witnesses:
L. H. Staaden.
Anna Hoyd.

Inventor:
Christian Valdemar Henrichsen
by Arf Uhler
Atty.

UNITED STATES PATENT OFFICE.

CHRISTIAN VALDEMAR HENRICHSEN, OF COPENHAGEN, DENMARK.

PULSATOR FOR PNEUMATIC MILKING.

1,045,402.  Specification of Letters Patent.  Patented Nov. 26, 1912.

Application filed January 6, 1911.  Serial No. 601,079.

*To all whom it may concern:*

Be it known that I, CHRISTIAN VALDEMAR HENRICHSEN, of 134 Borgergade, Copenhagen, in the Kingdom of Denmark, mechanical engineer, have invented certain new and useful Improvements in and Connected with Pulsators for Pneumatic Milking, of which the following is a specification, reference being had therein to the accompanying drawing.

This invention relates to improvements in and connected with pulsators for pneumatic milking.

Pulsators for pneumatic milking are found defective inasmuch as the small metal slide, tap or valve body which, by alternately covering and uncovering the passage for the pneumatic motive power, serves to reverse the operative member of the pulsator, is not sufficiently reliable in action, owing to the fact that it wears very soon, becomes clogged with dust, requires lubricating and skilled attention.

To remedy the said defects according to the present invention the wall or walls which at predetermined times cause the passage or passages of the respective pneumatic power or powers to be cut off are formed of non-metallic soft material (caoutchouc, gutta percha or india rubber). This material does not slide on other parts when moved to cut off but is freed at one or a number of sides or moved in an axial direction into the path of the pneumatic motive power so that the path is contracted or closed altogether. A device of this kind for instance may be used consisting of an india rubber tube which forms a part of the passage of the motive power and is alternately pinched together and released; a plate of india rubber more or less flat or a tube alternately pressed against and removed from the orifice of the passage may also be employed. The mechanical means by which the said soft material is actuated may be of the kind generally used with pulsator slides under the influence of the pneumatic operative member, with or without the insertion of springs to cause a sudden cutting off or opening of the passage orifice for the motive power, just when the operative member takes up its end positions.

In the example shown in the drawing, it is assumed that the movement of the working member, say a diaphragm, is transmitted by means of a screw like body, which is turned by the diaphragm and causes a spring to be placed under tension which by suitable connections, operates on the soft material.

Figure 2:
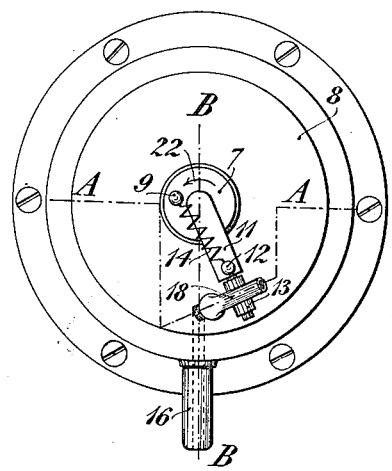
Figure 3:
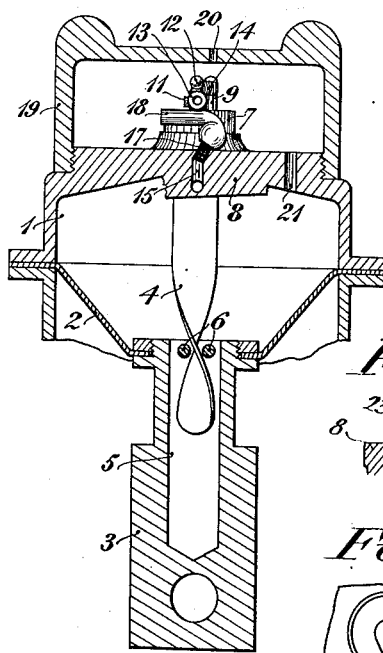
Figure 5:
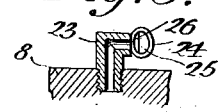
Figure 6:
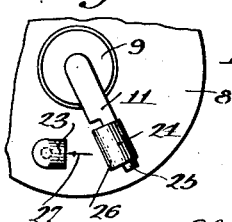

In the accompanying drawing—Figure 1 is a vertical section on line A—A of Fig. 2 through the pulsator with the new cut off device open. Fig. 2 a plan of Fig. 1. Fig. 3 a longitudinal section with device closed, and Fig. 4 a vertical section on line B—B of Fig. 2 with device closed. Figs. 5 and 6 are views of details of another embodiment of this invention showing respectively a vertical section and a plan of the device the valve being shown closed in Fig. 5 and open in Fig. 6.

In carrying out my invention and referring to Figs. 1–4, 1 is the working chamber, 2 the diaphragm, 3 the pulsator valve body, and 4 a bar twisted so as to form a screw movable to and fro in the cylindrical bore 5 in the body 3.

Figure 4:
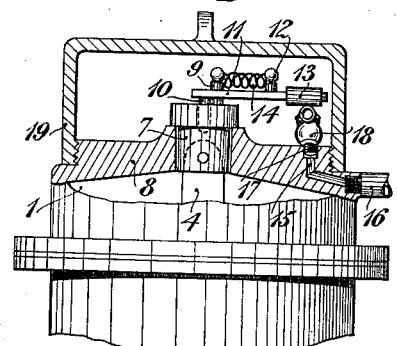

The screw 4 engages between two studs 6 which cause it to turn, and has a head 7, Fig. 4, rotably mounted in a bore formed centrally in the top 8 of the working chamber. The head 7 carries an eccentric stud 9 and has a central hole adapted to receive the stud 10 at the end of an arm 11. This arm has a second stud 12 and carries a roller 13. The studs 9 and 12 are connected by a helical spring 14.

The vacuum duct 15 has connected to it at its outer end a pipe 16 and at its inner end a nozzle 17 for a flexible tube 18 which is located in the path of the roller 13. By preference the nozzle 17 is so arranged that the flexible tube 18 when open forms an acute angle with the path of the roller 13 and therefore can be bent by the roller 13 about an angle greater than 90 degrees.

To the top 8 is secured a cap 19 in which is an air port 20. The top 8 has also a port 21 opening into the cap 19.

Immediately before the parts reach the position shown in Figs. 1 and 2, the vacuum in the working chamber 1 has operated, to raise the diaphragm 2 and valve body 3 thereby turning the screw 4 and its head 7, the stud 9 describing the arc shown by arrow 22, Fig. 2. The moment this position has been reached another movement is produced, the spring 14 which being under tension will draw the arm 11 in such a manner into the position shown in Figs. 3 and 4, in which the roller 13 presses or pinches the flexible tube 18 together. The air which during the preceding vacuum period was sucked away to a greater amount than could enter through the port 20, can now act freely through the port 21; the diaphragm 2 and valve body 3 will therefore be moved downward. At the close of this period all parts will thus occupy the positions shown in Figs. 3 and 4, from which positions however, they are at once returned by the spring 14 which again draws the arm 11 back into the position shown in Figs. 1 and 2, whereby the flexible pipe 18 is released and the exhausting of the working chamber is allowed to commence again.

The flexible tube 18 may cut off either of the motive powers and also the atmosphere as well as the vacuum. To illustrate this action a vacuum connection 16ª is shown in Fig. 7, which communicates freely with the interior of the cap 19, so that by means of the port 21 the working chamber 1 is always in communication with the vacuum. In this case, of course, it must be assumed that the bore 15ª communicates with the atmosphere, so that when the flexible tube 18ᵇ is in the position shown in Fig. 7, it forms a passage for the entering air. Further by means of two flexible tubes 18, 18ª both motive powers may be alternately cut off, for instance by causing the flexible tubes to cut off the inflowing or the outflowing air. This action is illustrated in Fig. 8. The arm 11 which at one time closes the flexible tube 18 (for the outflowing air or air removed by the vacuum connection is shown connected with the arm 11ª. The latter closes at the second period a second flexible tube 18ª which may form a passage for the inflowing air to the working chamber.

In the construction shown in Figs. 5 and 6, a piece of flexible tube 24 is shown on the arm 11, the outer end 25 of which is of semi-circular cross-section, so that it will not touch the part of the flexible tube 24 which in this case is intended to close the opening 23 for the inflowing air. This device is particularly suitable for cutting off motive power which moves in the direction shown by the arrow 27 in Fig. 6, while the flexible tube 18 above referred to is applicable for inflowing as well as for outflowing air.

I claim:—

1. In pulsators for pneumatic milking the combination with a casing open to the atmosphere and a pulsator valve body located therein, of an actuating member connected to said valve body, a vacuum connection, a valve independent of said valve body for controlling the flow of air from said casing respectively through said connection and movable means adapted to be operated by the movements of said actuating member to periodically interrupt the flow of air from said casing.

2. In pulsators for pneumatic milking the combination with a casing open to the atmosphere and a pulsator valve body located therein, of a flexible diaphragm connected to said valve body, a vacuum connection, a flexible tube for controlling the flow of air from said casing through said vacuum connection, and movable means adapted to be operated by the movements of said diaphragm to periodically move said tube to interrupt the flow of air from said casing.

3. In pulsators for pneumatic milking, the combination with a casing open to the atmosphere and a pulsator valve body located therein, of a flexible diaphragm connected to said valve body, a vacuum connection, a flexible tube for controlling the flow of air from said casing through said vacuum connection, and a movable arm coöperatively connected with said valve body and adapted to be actuated by the movements of said diaphragm to periodically close said flexible tube, thereby interrupting the flow of air from said casing.

4. In pulsators for pneumatic milking the combination with a casing open to the atmosphere and a pulsator valve body located therein, of a diaphragm connected to said valve body, a vacuum connection, a flexible tube controlling the flow of air from said casing through said vacuum connection, a movable arm, and means connecting said movable arm with said valve body, so as to cause said movable arm upon the downward movement of said valve body to close said flexible tube, thereby interrupting the flow of air from said casing.

5. In pulsators for pneumatic milking the combination with a casing open to the atmosphere and a pulsator valve body located therein, of a diaphragm connected to said valve body, a vacuum connection, a valve independent of said valve body for controlling the flow of air from said casing through said vacuum connection, movable means adapted to interrupt the flow of air from said casing and a connecting member between said movable means and said valve body for transmitting the periodical movements of said valve body to said movable means.

6. In pulsators for pneumatic milking the combination with a casing open to the atmosphere and a pulsator valve body located therein, of a diaphragm connected to said valve body, a vacuum connection, a flexible tube for controlling the flow of air from said casing through said vacuum connection, a movable arm adapted to close said tube, thereby interrupting the flow of air from said casing, and a spring connecting said movable arm with said valve body to transmit the periodical movements of said valve body to said arm.

7. In pulsators for pneumatic milking the combination with a casing open to the atmosphere and a pulsator valve body located therein, of a flexible diaphragm connected to said valve body, a vacuum connection, a valve independent of said valve body, for controlling the flow of air from said casing through said vacuum connection, a movable member adapted to close said valve, a twisted bar and a spring connecting said valve body with said movable arm to transmit the movement of said valve body to said movable arm.

8. In pulsators for pneumatic milking the combination with a casing open to the atmosphere and a pulsator valve body located therein, of a diaphragm connected to said valve body, a vacuum connection, a flexible tube for controlling the flow of air from said casing through said vacuum connection, a twisted bar adapted to be operated by said valve body, a revoluble head on said bar, an arm mounted in said head to close said flexible tube, thereby interrupting the flow of air from said casing, and a spring for effecting the movements of said arm in each direction.

In testimony that I claim the foregoing as my invention, I have signed my name in presence of two subscribing witnesses.

CHRISTIAN VALDEMAR HENRICHSEN.

Witnesses:
ERNEST BOUTARD,
EMIL MOWEITZEN.